United States Patent
Zhang et al.

(10) Patent No.: US 11,651,633 B2
(45) Date of Patent: May 16, 2023

(54) SYSTEM AND METHOD FOR ESTIMATING A CLUTCH TORQUE OF AN ELECTRONIC LIMITED SLIP DIFFERENTIAL AND TIRE LONGITUDINAL FORCES

(71) Applicant: GM GLOBAL TECHNOLOGY OPERATIONS LLC, Detroit, MI (US)

(72) Inventors: Yubiao Zhang, Sterling Heights, MI (US); SeyedAlireza Kasaiezadeh Mahabadi, Novi, MI (US); Seyedeh Asal Nahidi, North York (CA); Naser Mehrabi, Richmond Hill (CA); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 17/325,709

(22) Filed: May 20, 2021

(65) Prior Publication Data
US 2022/0383668 A1 Dec. 1, 2022

(51) Int. Cl.
*G07C 5/08* (2006.01)
(52) U.S. Cl.
CPC .................................. *G07C 5/0808* (2013.01)
(58) Field of Classification Search
CPC ..................................................... G07C 5/0808
See application file for complete search history.

(56) References Cited

U.S. PATENT DOCUMENTS

| | | | |
|---|---|---|---|
| 2007/0184929 A1* | 8/2007 | Piyabongkarn | F16H 48/34 475/84 |
| 2016/0031431 A1* | 2/2016 | Johri | B60W 20/15 180/65.265 |
| 2018/0135747 A1* | 5/2018 | Kokko | F16D 48/02 |
| 2020/0317048 A1* | 10/2020 | Kasaiezadeh Mahabadi | B60K 1/02 |
| 2021/0245732 A1* | 8/2021 | Nahidi | B60K 17/165 |

FOREIGN PATENT DOCUMENTS

| WO | WO-2007088467 A2 * | 8/2007 | ............ B60K 17/16 |
|---|---|---|---|
| WO | WO-2015199606 A1 * | 12/2015 | ............ B60K 17/16 |

* cited by examiner

*Primary Examiner* — Joseph J Dallo

(57) ABSTRACT

A system includes a clutch state module and a clutch torque module. The clutch state module is configured to determine whether a clutch of an electronic limited slip differential is locked or unlocked. The electronic limited slip differential couples an engine of a vehicle to left and right wheels of the vehicle. The clutch torque module is configured to estimate an actual torque transferred by the clutch using a first clutch torque model when the electronic limited slip differential is unlocked, and estimate the actual clutch torque using a second clutch torque model when the electronic limited slip differential is locked. The second clutch torque model is different than the first clutch torque model.

20 Claims, 4 Drawing Sheets

SYSTEM AND METHOD FOR ESTIMATING A CLUTCH TORQUE OF AN ELECTRONIC LIMITED SLIP DIFFERENTIAL AND TIRE LONGITUDINAL FORCES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for estimating a clutch torque of an electronic limited slip differential and tire longitudinal forces.

A differential transfers torque from an engine of a vehicle to left and right wheels of the vehicle. A limited slip differential allows the left and right wheels to rotate at different speeds while limiting the maximum difference between the speeds of the left and right wheels. An electronic slip differential includes an electronically controlled clutch that allows the left and right wheels to rotate at different speeds when the clutch is unlocked and rotates the left and right wheels at or near the same speed when the clutch is locked.

SUMMARY

An example of a system according to the present disclosure includes a clutch state module and a clutch torque module. The clutch state module is configured to determine whether a clutch of an electronic limited slip differential is locked or unlocked. The electronic limited slip differential couples an engine of a vehicle to left and right wheels of the vehicle. The clutch torque module is configured to estimate an actual torque transferred by the clutch using a first clutch torque model when the electronic limited slip differential is unlocked, and estimate the actual clutch torque using a second clutch torque model when the electronic limited slip differential is locked. The second clutch torque model is different than the first clutch torque model.

In one aspect, the first clutch torque model includes a hyperbolic tangent function.

In one aspect, the hyperbolic tangent function is a function of a difference between speeds of the left and right wheels.

In one aspect, the first clutch torque model relates a requested clutch torque and a difference between speeds of the left and right wheels to the actual clutch torque, and the requested clutch torque is a requested amount of torque to be transferred by the clutch.

In one aspect, the second clutch torque model relates a tire longitudinal force at the left wheel and a tire longitudinal force at the right wheel to the actual clutch torque.

In one aspect, the system further includes a tire longitudinal force module configured to estimate the tire longitudinal forces at the left and right wheels using a first longitudinal force model when the electronic limited slip differential is unlocked, and estimate the tire longitudinal forces at the left and right wheels using a second longitudinal force model when the electronic limited slip differential is locked. The second longitudinal force model is different than the first longitudinal force model.

In one aspect, the first longitudinal force model relates the actual clutch torque and an axle input torque to the tire longitudinal forces at the left and right wheels, and the axle input torque is an amount of torque transferred from the engine to the electronic limited slip differential.

In one aspect, the second longitudinal force model includes a first relationship between an axle input torque and the tire longitudinal forces at the left and right wheels and a second relationship between tire vertical forces at the left and right wheels and the tire longitudinal forces at the left and right wheels, and the axle input torque is an amount of torque transferred from the engine to the electronic limited slip differential.

In one aspect, based on a slip ratio of the left and right wheels, the tire longitudinal force module selects the second relationship from a plurality of different relationships between the tire vertical forces at the left and right wheels and the tire longitudinal forces at the left and right wheels.

In one aspect, the clutch state module is configured to determine whether the clutch is locked or unlocked based on a difference between speeds of the left and right wheels, and a torque capacity of the clutch.

Another example of a system according to the present disclosure includes a clutch state module and a tire longitudinal force module. The clutch state module is configured to determine whether a clutch of an electronic limited slip differential is locked or unlocked. The electronic limited slip differential couples an engine of a vehicle to left and right wheels of the vehicle. The tire longitudinal force module is configured to estimate tire longitudinal forces at the left and right wheels using a first longitudinal force model when the electronic limited slip differential is unlocked, and estimate the tire longitudinal forces at the left and right wheels using a second longitudinal force model when the electronic limited slip differential is locked. The second longitudinal force model is different than the first longitudinal force model.

In one aspect, the first longitudinal force model relates an actual clutch torque and an axle input torque to the tire longitudinal forces at the left and right wheels, the actual clutch torque is an actual torque transferred by the clutch, and the axle input torque is an amount of torque transferred from the engine to the electronic limited slip differential.

In one aspect, the system further includes a clutch torque module configured to estimate the actual clutch torque using a first clutch torque model when the electronic limited slip differential is unlocked, and estimate the actual clutch torque using a second clutch torque model when the electronic limited slip differential is locked. The second clutch torque model is different than the first clutch torque model.

In one aspect, the first clutch torque model relates a requested clutch torque and a difference between the left and right wheel speeds to the actual clutch torque, and the requested clutch torque is a requested amount of torque to be transferred by the clutch.

In one aspect, the second clutch torque model relates a tire longitudinal force at the left wheel and a tire longitudinal force at the right wheel to the actual clutch torque.

In one aspect, the second longitudinal force model includes a first relationship between an axle input torque and the tire longitudinal forces at the left and right wheels and a second relationship between tire vertical forces at the left and right wheels and the tire longitudinal forces at the left and right wheels, and the axle input torque is an amount of torque transferred from the engine to the electronic limited slip differential.

In one aspect, based on a slip ratio of the left and right wheels, the tire longitudinal force module selects the second relationship from a plurality of different relationships between the tire vertical forces at the left and right wheels and the tire longitudinal forces at the left and right wheels.

Another example of a system according to the present disclosure includes a clutch state module, a clutch torque module, and a tire longitudinal force module. The clutch state module is configured to determine whether a clutch of an electronic limited slip differential is locked or unlocked. The electronic limited slip differential couples an engine of a vehicle to left and right wheels of the vehicle. The clutch torque module is configured to estimate an actual torque transferred by the clutch using a first clutch torque model when the electronic limited slip differential is unlocked, and estimate the actual clutch torque using a second clutch torque model when the electronic limited slip differential is locked. The second clutch torque model is different than the first clutch torque model. The tire longitudinal force module is configured to estimate tire longitudinal forces at the left and right wheels using a first longitudinal force model when the electronic limited slip differential is unlocked, and estimate the tire longitudinal forces at the left and right wheels using a second longitudinal force model when the electronic limited slip differential is locked. The second longitudinal force model is different than the first clutch torque model.

In one aspect, the first clutch torque model includes a first-order transfer function that relates a requested clutch torque and a hyperbolic tangent function of a difference between speeds of the left and right wheels to the actual clutch torque, the requested clutch torque is a requested amount of torque while accounting for transient dynamics of the clutch to be transferred by the clutch, the second clutch torque model relates a tire longitudinal force at the left wheel and a tire longitudinal force at the right wheel to the actual clutch torque, the first longitudinal force model relates the actual clutch torque and an axle input torque to the tire longitudinal forces at the left and right wheels, the axle input torque is an amount of torque transferred from the engine to the electronic limited slip differential, and the second longitudinal force model includes a first relationship between the axle input torque and the tire longitudinal forces at the left and right wheels and a second relationship between tire vertical forces at the left and right wheels and the tire longitudinal forces at the left and right wheels.

In one aspect, based on a slip ratio of the left and right wheels, the tire longitudinal force module selects the second relationship from a plurality of different relationships between the tire vertical forces at the left and right wheels and the tire longitudinal forces at the left and right wheels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Powertrain control systems estimate the amount of torque transferred by a clutch of an electronic limited slip differential (eLSD) and control the eLSD clutch based on the estimated clutch torque. In one example, a powertrain control system adjusts the pressure of hydraulic fluid supplied to the clutch to minimize a difference between a requested clutch torque and the estimated clutch torque. Thus, estimating the clutch torque enables powertrain control systems to control the amount of torque transferred by the clutch 34 in a close-loop manner.

Powertrain control systems also estimate tire longitudinal forces at the left and right wheels that are coupled to the eLSD and control the torque output of an engine based on the estimated tire longitudinal forces. In one example, a powertrain control system determines target tire longitudinal forces to achieve a target vehicle acceleration, and adjusts the actuators of the engine to minimize the difference between the target tire longitudinal forces and the estimated tire longitudinal forces. Thus, estimating the tire longitudinal forces enables powertrain control systems to control the tire longitudinal forces (and vehicle acceleration) in a close-loop manner.

A powertrain control system according to the present disclosure estimates the eLSD clutch torque and the tire longitudinal forces in an accurate manner, which improves the closed-loop control of these parameters and thereby improves vehicle performance. In one example, the powertrain control system uses a hyperbolic tangent function to model the behavior of the eLSD and estimates the eLSD clutch torque using the model when the eLSD clutch is unlocked. The hyperbolic tangent function accounts for the fact that the maximum torque capacity of the eLSD clutch is not always achievable as requested.

In another example, the model used by the powertrain control system to estimate the clutch torque when the eLSD clutch is unlocked accounts for actuator delay. In turn, the powertrain control system avoids a chattering issue that otherwise may occur when the difference between the speeds of the wheels coupled to the eLSD is near zero. In yet another example, when the eLSD clutch is locked, the powertrain control system estimates the eLSD clutch torque using a model as opposed to simply setting the estimated clutch torque to zero. As a result, the estimated clutch torque is more accurate when the eLSD clutch is locked.

Figure 1:
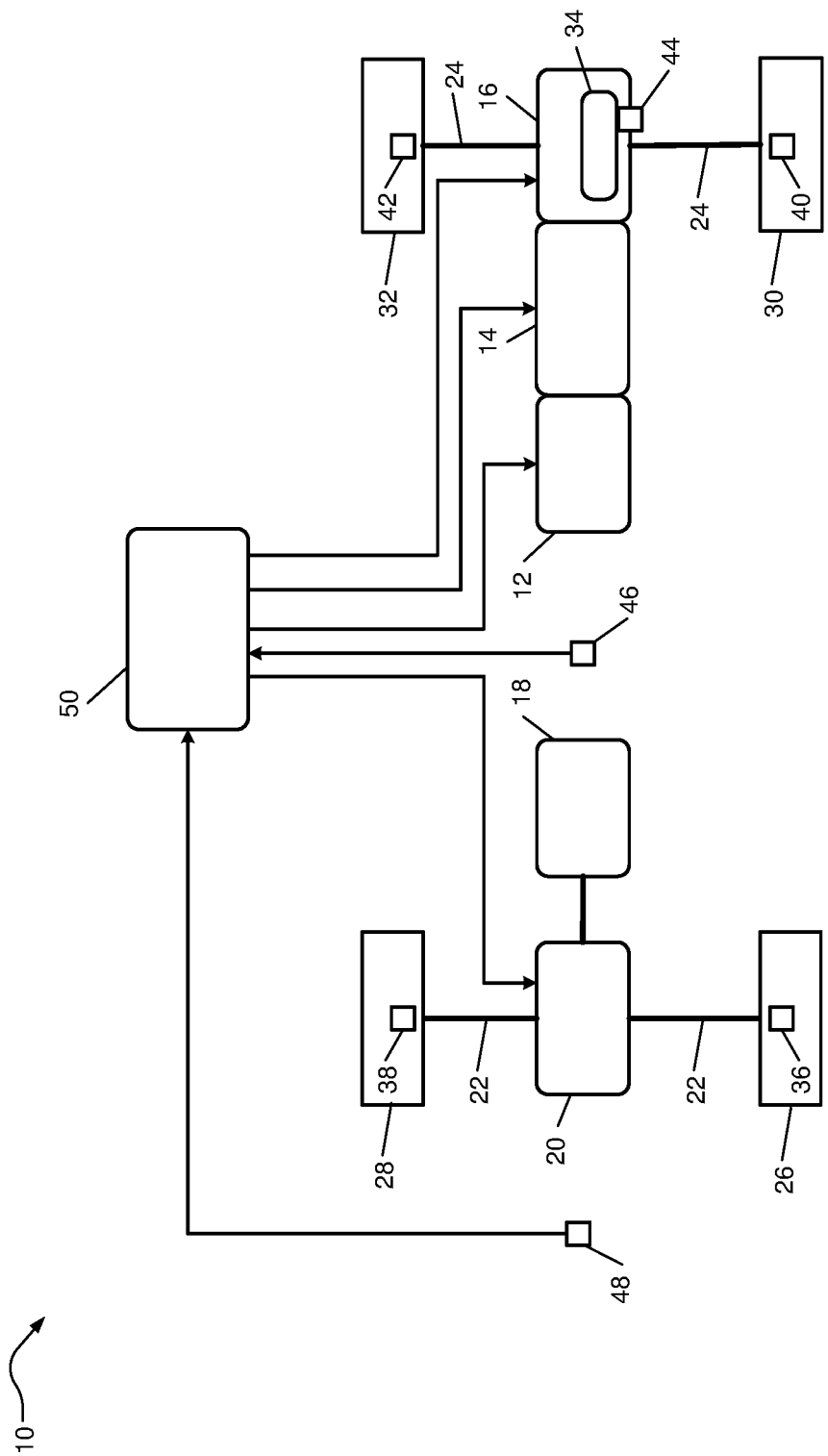
FIG. 1 is a functional block diagram of an example vehicle according to the present disclosure.

Referring now to FIG. 1, a vehicle 10 includes an engine 12, a transmission 14, an eLSD 16, a battery 18, an electric motor 20, front half shafts 22, rear half shafts 24, a left front wheel 26, a right front wheel 28, a left rear wheel 30, and a right rear wheel 32. The engine 12 combusts a mixture of air and fuel to produce drive torque. The transmission 14 transfers torque from the engine 12 to the eLSD 16 at one of a plurality of different gear ratios.

The eLSD 16 transfers torque from the transmission 14 to the left and right rear wheels 30 and 32 through the rear half shafts 24. The battery 18 supplies power to the electric motor 20. The electric motor 20 rotates the left and right front wheels 26 and 28 through the front half shafts 22.

The eLSD 16 includes a clutch 34 that transfers torque from the left rear wheel 30 to the right rear wheel 32 and vice versa. When the clutch 34 is unlocked, the eLSD 16 allows the left and right rear wheels 30 and 32 to rotate at different speeds while limiting the maximum difference between the speed of the left and right rear wheels 30 and 32. When the clutch 34 is locked, the eLSD 16 drives the left and right rear wheels 30 and 32 at the same speed or nearly the same speed.

The vehicle 10 further includes a left front wheel speed sensor (WSS) 36, a right front WSS 38, a left rear WSS 40, a right rear WSS 42, a clutch pressure sensor 44, a vehicle motion sensor 46, a camera 48, and a powertrain control module 50. The left front WSS 36 measures the speed of the left front wheel 26. The right front WSS 38 measures the speed of the right front wheel 28. The left rear WSS 40 measures the speed of the left rear wheel 30. The right rear WSS 42 measures the speed of the right rear wheel 32.

The clutch pressure sensor 44 measures the pressure of hydraulic fluid supplied to the clutch 34 of the eLSD 16. The vehicle motion sensor 46 measures the longitudinal (fore-aft) acceleration of the vehicle 10, the lateral (side-to-side) acceleration of the vehicle 10, and the yaw rate of the vehicle 10. The vehicle motion sensor 46 may be an inertial measurement unit that includes one or more accelerometers that measure the longitudinal and lateral acceleration of the vehicle 10 and a gyroscope the measures the yaw rate of the vehicle 10. The camera 48 captures images of the surface of the road on which the vehicle 10 is traveling.

The powertrain control module 50 controls the engine 12, the transmission 14, the eLSD 16, and the electric motor 20 based on inputs from the sensors of the vehicle 10. In one example, the powertrain control module 50 uses the sensor inputs to estimate the amount of torque transferred by the clutch 34 of the eLSD 16 and tire longitudinal forces at the left and right rear wheels 30 and 32. The powertrain control module 50 then controls the engine 12 and the clutch 34 of the eLSD 16 based on the estimated clutch torque and the estimated tire longitudinal forces.

The powertrain control module 50 adjusts the way in which it estimates the amount of torque transferred by the clutch 34 and/or the tire longitudinal forces at the left and right rear wheels 30 and 32 based on whether the clutch 34 is locked or unlocked. In one example, the powertrain control module 50 estimates the clutch torque using a first clutch torque model when the clutch 34 is unlocked, and the powertrain control module 50 estimates the clutch torque using a second clutch torque model when the clutch 34 is locked. The second clutch torque model is different than the first clutch torque model.

Figure 2:
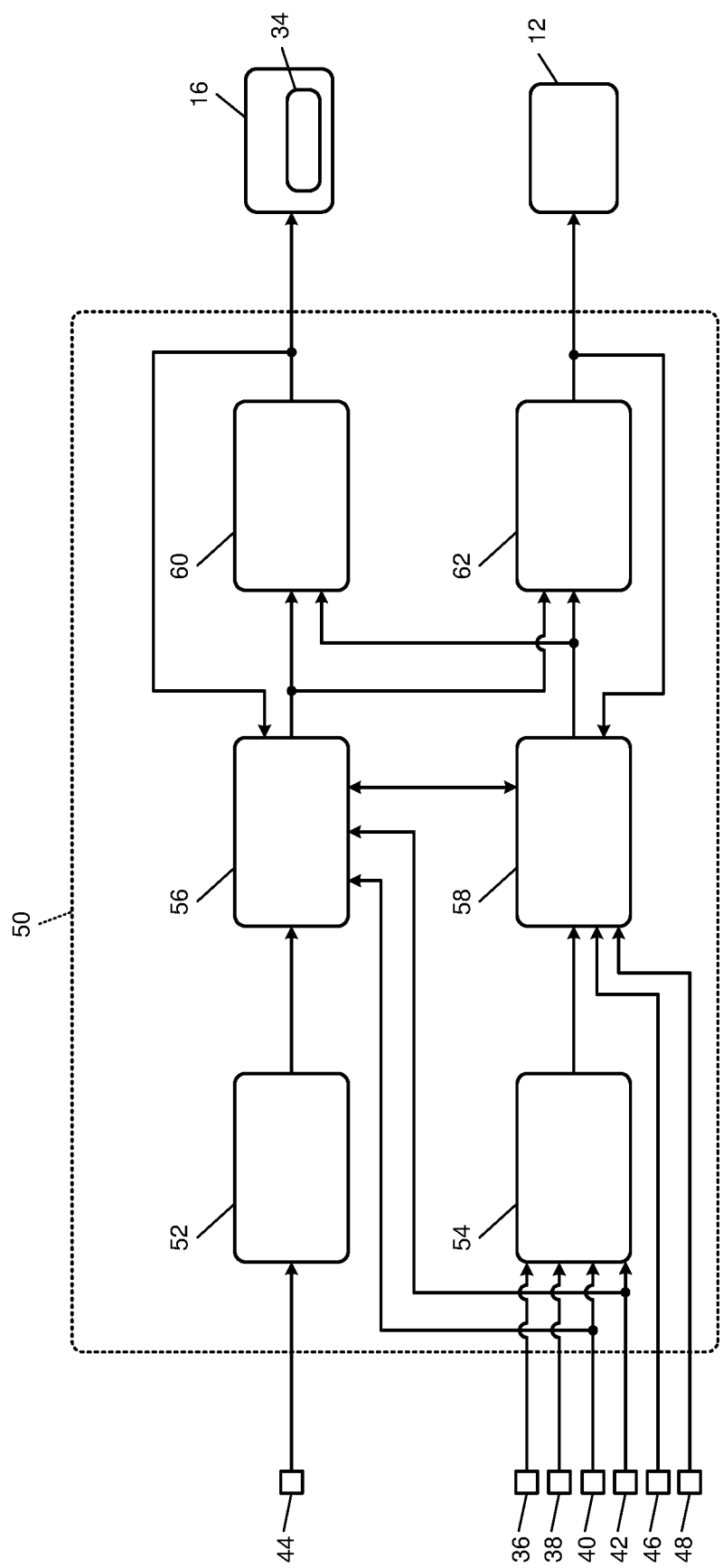
FIG. 2 is a functional block diagram of an example powertrain control module according to the present disclosure.

Referring now to FIG. 2, an example implementation of the powertrain control module 50 includes a clutch torque capacity module 52, a slip ratio module 54, a clutch torque module 56, a tire longitudinal force module 58, an eLSD clutch control module 60, and an engine control module 62. The clutch torque capacity module 52 may estimate the torque capacity of the clutch 34 of the eLSD 16 based on the clutch pressure from the clutch pressure sensor 44 using, for example, a lookup table and/or an equation. Alternatively, the torque capacity of the clutch 34 may be predetermined. The clutch torque capacity module 52 may increase the estimated clutch torque capacity as the clutch pressure increases and vice versa. The clutch torque capacity module 52 outputs the estimated clutch torque capacity.

The slip ratio module 54 determines the slip ratio of the left rear wheel 30 and the slip ratio of the right rear wheel 32. The slip ratio module 54 determines the slip ratio of the left rear wheel 30 based on the speed of the left rear wheel 30 and the speed of the vehicle 10. For example, the slip ratio module 54 may determine the slip ratio of the left rear wheel 30 using a relationship such as $$\kappa_{lr} = \frac{R_{\mathit{eff},r}\omega_{lr}-v_{x_{lr}}}{\max\left(R_{\mathit{eff},r}\omega_{lr},v_{x_{lr}}\right)}, \qquad (1)$$

where $\kappa_{lr}$ is the slip ratio of the left rear wheel 30, $\omega_{lr}$ is the speed (angular velocity) of the left rear wheel 30, $R_{\mathit{eff},r}$ is the effective radius of a free-rolling tire on each of the left and right rear wheels 30 and 32, and $v_{x_{lr}}$ is the translational speed at the center of left rear wheel 30. The slip ratio module 54 may determine the translation speed at the center of the left rear wheel 30 using a relationship such as $$v_{x_{lr}} = v_x - \frac{l_w r}{2}, \qquad (2)$$

where $v_x$ is the longitudinal speed of the vehicle 10, $l_w$ is the rear track width of the vehicle 10, and r is the yaw rate of the vehicle 10. Similarly, the slip ratio module 54 may determine the slip ratio of the right rear wheel 32 using a relationship such $$\kappa_{rr} = \frac{R_{\mathit{eff},r}\omega_{rr}-v_{x_{rr}}}{\max\left(R_{\mathit{eff},r}\omega_{rr},v_{x_{rr}}\right)}, \qquad (3)$$

where $\kappa_{rr}$ is the slip ratio of the right rear wheel 32, $\omega_{rr}$ is the speed (angular velocity) of the right rear wheel 32, and $v_{x_{rr}}$ is the translational speed at the center of the right rear wheel 32. The slip ratio module 54 may determine the translation speed at the center of the right rear wheel 32 using a relationship such as $$v_{x_{rr}} = v_x - \frac{l_w r}{2}. \qquad (4)$$

The slip ratio module 54 receives the speeds of the left and right rear wheels 30 and 32 from the left rear WSS 40 and the right rear WSS 42, respectively. The effective rolling tire radius may be predetermined or estimated in real-time. The slip ratio module 54 may determine the speed of the vehicle 10 based on the wheel speeds from two or more of the wheel speed sensors 36, 38, 40, 42 and the effective rolling tire radius. For example, the slip ratio module 54 may determine four values of the vehicle speed corresponding to the wheel speeds from the wheel speed sensors 36, 38,40,42, and then set the vehicle speed equal to an average value of the four values. The slip ratio module 54 outputs the slip ratios of the left and right rear wheels 30 and 32.

The clutch torque module 56 estimates the amount of torque transferred by the clutch 34. As discussed in more detail below, the clutch torque module 56 estimates the clutch torque using a first clutch torque model when the clutch 34 is unlocked, and the powertrain control module 50 estimates the clutch torque using a second clutch torque model when the clutch 34 is locked. The second clutch torque model is different than the first clutch torque model. The clutch torque module 56 outputs the estimated clutch torque.

The tire longitudinal force module 58 estimates the tire longitudinal forces at the left and right rear wheels 30 and 32. As discussed in more detail below, the tire longitudinal force module 58 estimates the tire longitudinal forces using a first longitudinal force model when the clutch 34 is unlocked, and the tire longitudinal force module 58 estimates the clutch torque using a second longitudinal force model when the clutch 34 is locked. The second longitudinal force model is different than the first longitudinal force model. The tire longitudinal force module 58 outputs the estimated tire longitudinal forces.

The eLSD clutch control module 60 controls the amount of torque transferred by the clutch 34 of the eLSD 16. The eLSD clutch control module 60 accomplishes this by generating a requested clutch torque based on, for example, the yaw rate of the vehicle 10 and the slip ratios of the left and right rear wheels 30 and 32. The requested clutch torque is a requested (or target) amount of torque to be transferred by the clutch 34. In one example, the eLSD clutch control module 60 identifies when the vehicle 10 is in an oversteer condition based on the vehicle yaw rate and the slip ratios, and increases the requested clutch torque to correct the oversteer condition. The eLSD clutch control module 60 outputs the requested clutch torque and/or controls the clutch 34 to achieve the requested clutch torque.

The eLSD clutch control module 60 also controls the clutch 34 based on the estimated clutch torque. In one example, the eLSD clutch control module 60 adjusts the pressure of hydraulic fluid supplied to the clutch 34 to minimize a difference between the requested clutch torque and the estimated clutch torque. Thus, the estimated clutch torque enables the eLSD clutch control module 60 to control the amount of torque transferred by the clutch 34 in a close-loop manner. The eLSD clutch control module 60 may adjust the clutch pressure by adjusting the position of a pump and/or a valve in the eLSD 16 that regulates the clutch pressure.

The engine control module 62 controls the torque output of the engine 12 based on a driver input (e.g., accelerator pedal position, cruise control set speed). The engine control module 62 accomplishes this by generating a requested engine torque based on the driver input, and adjusts actuators (e.g., throttle, fuel injector, spark plug) of the engine 12 to achieve the requested engine torque. In one example, the engine control module 62 determines a target vehicle acceleration based on the driver input and increases or decreases the requested engine torque as the target vehicle acceleration increases or decreases, respectively. The eLSD clutch control module 60 outputs the requested engine torque and/or controls the actuators of the engine 12 to achieve the requested engine torque.

The engine control module 62 also controls the torque output of the engine 12 based on the tire longitudinal forces. In one example, the engine control module 62 determines target tire longitudinal forces to achieve the target vehicle acceleration, and adjusts the actuators of the engine 12 to minimize a difference between the target tire longitudinal forces and the estimated tire longitudinal forces. Thus, the estimated tire longitudinal forces enable the engine control module 62 to control the tire longitudinal forces (and vehicle acceleration) in a close-loop manner.

Figure 3:
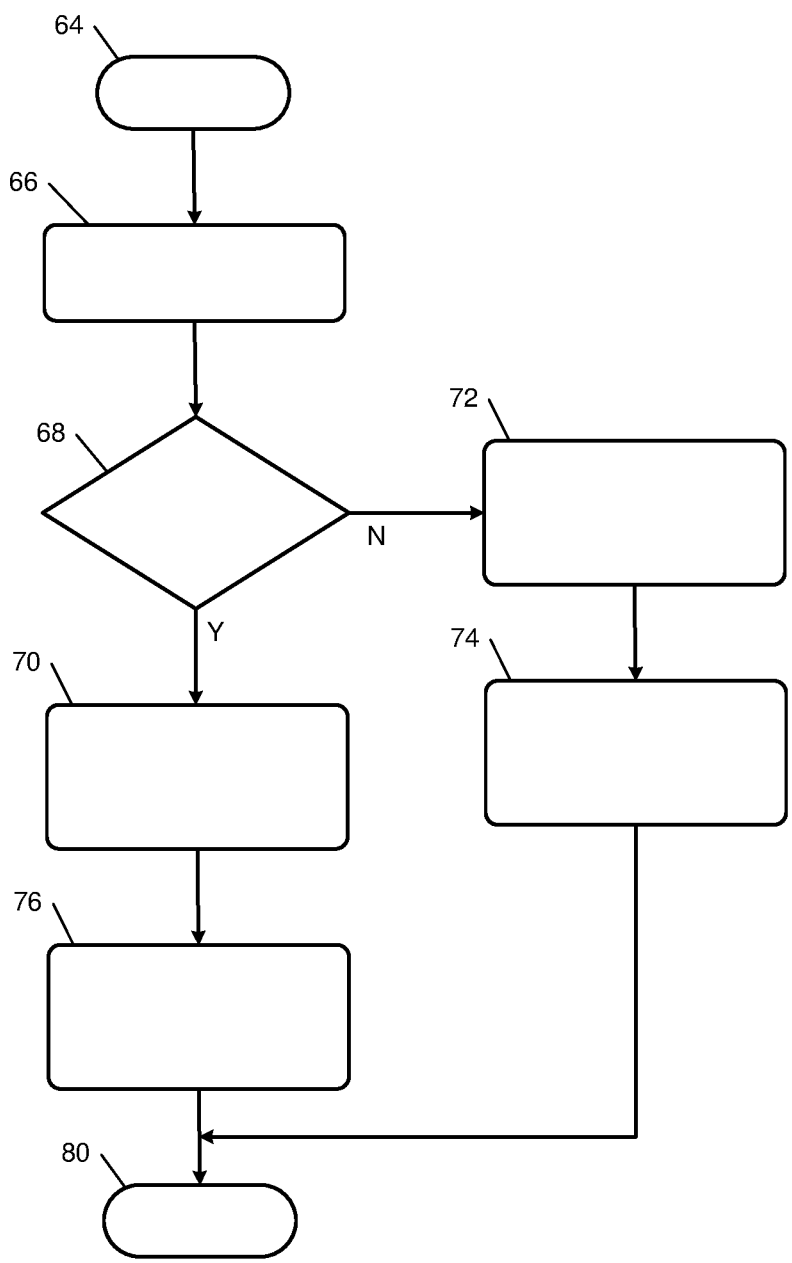
FIG. 3 is a flowchart illustrating an example method of estimating an electronic limited slip differential clutch torque and tire longitudinal forces according to the present disclosure.

Referring now to FIG. 3, a method for estimating the amount of torque transferred by the clutch 34 of the eLSD 16 and the tire longitudinal forces at the left and right rear wheels 30 and 32 begins at 64. In the description of the method set forth below, the modules of FIG. 2 perform the steps of the method. However, the particular modules that perform the steps of the method may differ from the description below. Additionally or alternatively, one or more steps of the method may be performed independent of any module.

At 66, the powertrain control module 50 monitors operating parameters of the vehicle 10. The clutch torque capacity module 52 monitors the clutch pressure from the clutch pressure sensor 44. The slip ratio module 54 monitors the wheel speeds from the left front, right front, left rear, and right rear WSSs 36, 38, 40, and 42. The tire longitudinal force module 58 monitors the longitudinal vehicle acceleration, the lateral vehicle acceleration, and the vehicle yaw rate from the vehicle motion sensor 46.

At 68, the clutch torque module 56 determines the state of the clutch 34 (i.e., whether the clutch 34 is locked or unlocked). The clutch torque module 56 may determine the state of the clutch 34 based on the difference between the speeds of the left and right rear wheels 30 and 32 and/or the torque capacity of the clutch 34. If the clutch 34 is locked, the method continues at 70. Otherwise, the method continues at 72. The clutch torque module 56 may be referred to or include a clutch state module that determines the state of the clutch 34 as described herein. Alternatively, the clutch state module may be separate from the clutch torque module 56 and communicate therewith.

In one example, the clutch torque module 56 determines that the clutch 34 is locked when the rear wheel speed difference is less than a slip threshold (e.g., 0.5 radians per second) and the clutch torque capacity is greater than a torque threshold (e.g., 100 Newton-meters). Conversely, the clutch torque module 56 determines that the clutch 34 is unlocked when the rear wheel speed difference is greater than or equal to the first threshold. The clutch torque module 56 receives the clutch torque capacity from the clutch torque capacity module 52.

At 72, the clutch torque module 56 estimates the actual amount of torque transferred by the clutch 34 of the eLSD 16 using the first clutch torque model. The first clutch torque model may be referred to as an unlocked eLSD model. In one example, the first clutch torque model is embodied by the following relationship:

$$T_{c\_act} = \frac{1}{\tau_c s + 1} p_1 \tanh(p_2 * (d\omega)^{p3}) T_{c\_rqst},$$

where $T_{c\_act}$ is the actual clutch torque, $T_c$ is a time constant characterizing the behavior of the clutch 34, s is a complex variable used in a Laplace transform, p1, p2, p3, and are unitless constants characterizing the dynamics behavior of the clutch 34, tanh is a hyperbolic tangent function, dω is the difference between the speeds of the left and right rear wheels 30 and 32, and Tc_rqst is the requested clutch torque. Thus, the first clutch torque model relates the requested clutch torque and a hyperbolic tangent function of the rear wheel speed difference to the actual clutch torque. In addition, the first clutch torque model accounts for the transient dynamics of the clutch 34 using a first-order transfer function. The clutch torque module 56 may determine the time constant TC based on the clutch torque capacity or the requested clutch torque using, for example, a lookup table and/or an equation. The constants p1, p2, p3 may be predetermined. The clutch torque module 56 receives the requested clutch torque from the eLSD clutch control module 60.

At 74, the tire longitudinal force module 58 estimates the tire longitudinal forces of the left and right rear wheels 30 and 32 using the first longitudinal force model. The first longitudinal force model may be referred to as a wheel dynamics model. In one example, the first longitudinal force model includes the following two relationships:

$$I_{wr}\dot{\omega}_{rl} = \frac{T_{r\_act} + T_{c\_act}}{2} - R_{eff,r}F_{xrl} = R_{eff,r}F_{roll,rl}, \text{ and} \quad (6)$$

$$I_{wr}\dot{\omega}_{rr} = \frac{T_{r\_act} + T_{c\_act}}{2} - R_{eff,r}F_{xrr} = R_{eff,r}F_{roll,rr}, \text{ and} \quad (7)$$

where $F_{xrl}$ is the tire longitudinal force at the left rear wheel 30, $F_{xrr}$ is the tire longitudinal force at the right rear wheel 32, $F_{roll,rl}$ is the rolling resistance force at the left rear wheel 30, $F_{roll,rr}$ is the rolling resistance force at the right rear wheel 32, $T_{r\_act}$ is the actual rear axle torque (i.e., the amount of torque transferred from the engine 12 to the eLSD 16), $I_{wr}$ is the moment of inertia of each of the left and right rear wheels 30 and 32, $\dot{w}_{rl}$ is the angular acceleration of the left rear wheel 30, and $\dot{w}_{rl}$ is the angular acceleration of the right rear wheel 32.

The tire longitudinal force module 58 may set the rolling resistance force $F_{roll,rl}$ equal to a product of a constant (e.g., 0.01) and a tire vertical force at the left rear wheel 30. The tire longitudinal force module 58 may set the rolling resistance force $F_{roll,rr}$ equal to a product of a constant (e.g., 0.01) and a tire vertical force at the right rear wheel 32. The tire longitudinal force module 58 may determine the actual rear axle torque based on actuator values (e.g., throttle position, fuel injection timing, spark timing) of the engine 12 and the current gear ratio of the transmission 14. The moment of inertia of the wheels 30, 32 may be predetermined. The tire longitudinal force module 58 may determine the left and right rear wheel angular accelerations by differentiating the left and right rear wheel speeds, respectively, with respect to time.

At 70, the tire longitudinal force module 58 estimates the tire longitudinal forces of the left and right rear wheels 30 and 32 using the second longitudinal force model. The second longitudinal force model includes an axle dynamics model that is embodied by the following relationship:

$$R_{eff,r}F_{xrl} + R_{eff,r}F_{xrr} = T_{r\_act} - I_{wr}\dot{\omega}_{rl} - I_{wr}\dot{\omega}_{rr}, \text{ and}$$

In addition, the second longitudinal force model includes one of the following relationships:

$$\frac{F_{xrl}}{\mu_{rl}F_{zrl}} - \frac{F_{xrr}}{\mu_{rr}F_{zrr}} = K_{norm} * \frac{l_w r}{R_{eff,r}\omega_{rr}}, \quad (9)$$

$$\frac{F_{xrl}}{F_{xrr}} = \frac{\mu_{rl}F_{zrl}}{\mu_{rr}F_{zrr}}, \text{ and} \quad (10)$$

$$\frac{F_{xrl}}{\mu_{rl}F_{zrl}} - \frac{F_{xrr}}{\mu_{rr}F_{zrr}} = 1 - K_{norm} * \kappa_{rr}, \quad (11)$$

where $F_{zrl}$ is the tire vertical force at the left rear wheel 30, $F_{zrr}$ is the tire vertical force at the right rear wheel 32, $\mu_{rl}$ is the coefficient of friction of the road surface on which the left rear wheel 30 is travelling, $\mu_{rr}$ is the coefficient of friction of the road surface on which the right rear wheel 32 is travelling, $K_{norm}$ is the normalized longitudinal tire stiffness of each of the left and right rear wheels 30 and 32, $l_w$ is the track width of the vehicle 10, r is the yaw rate of the vehicle 10, and $K_{rr}$ is the slip ratio of the right rear wheel 32. The tire longitudinal force module 58 may estimate the tire vertical forces at the left and right rear wheels 30 and 32 based on the longitudinal and lateral vehicle accelerations from the vehicle motion sensor 46. The tire longitudinal force module 58 may estimate the coefficients of friction at the left and right rear wheels 30 and 32 based on the road images captured by the camera 48. The vehicle track width is predetermined. The longitudinal tire stiffness may be predetermined or determined by the tire longitudinal force module 58 based on the tire vertical forces.

The tire longitudinal force module 58 selects one of the relationships (9), (10), or (11) to include in the second longitudinal force model based on the slip ratios of the left and right rear wheels 30 and 32. In one example, the tire longitudinal force module 58 selects one of the relationships (9), (10), or (11) based on the relationship between (i) the slip ratios of the left and right rear wheels 30 and 32 and (ii) for the same wheel, the normalized longitudinal force. More specifically, the tire longitudinal force module 58 selects one of the relationships (9), (10), or (11) based on whether the relationship between the slip ratios and the normalized longitudinal forces are within a linear or nonlinear region. The normalized longitudinal force of a wheel is the ratio of the tire longitudinal force at the wheel to the product of the coefficient of friction at the wheel and the tire vertical force at the wheel.

Figure 4:
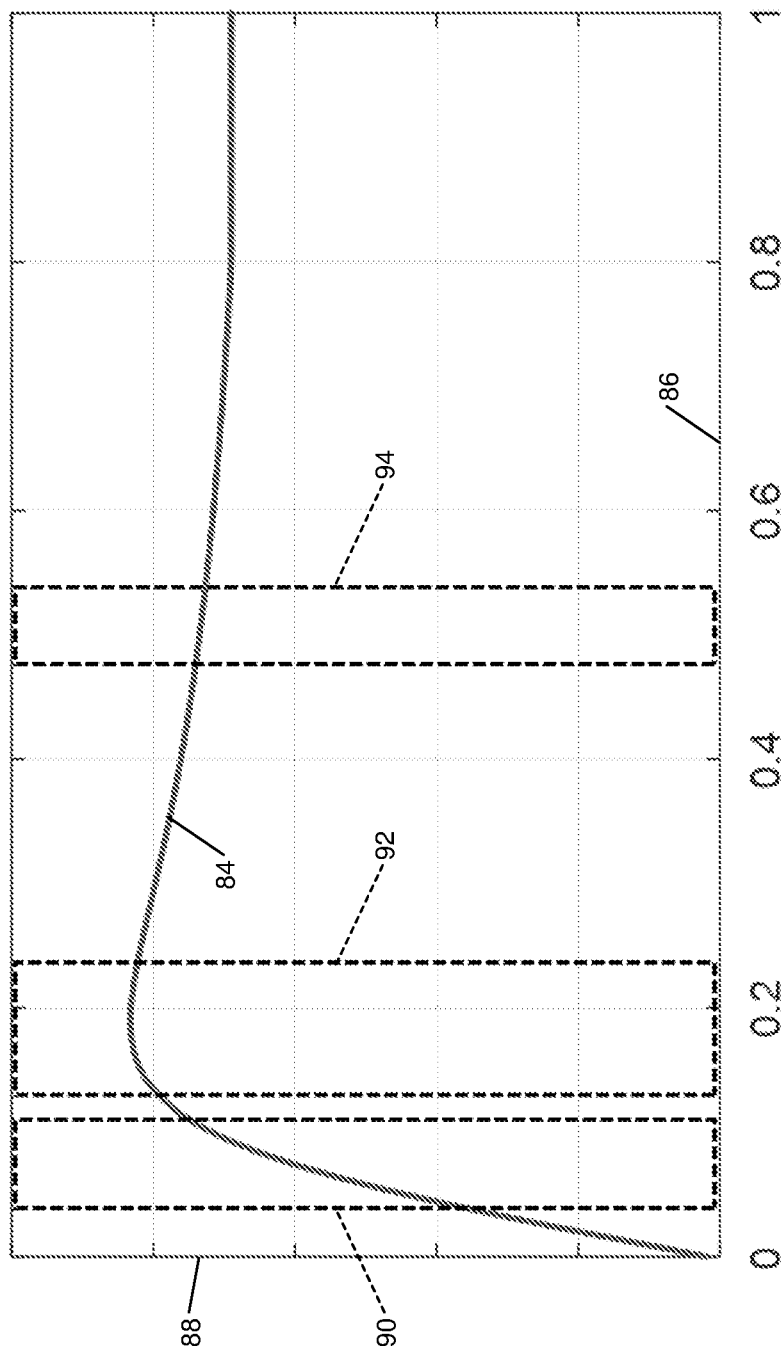
FIG. 4 is a graph illustrating an example relationship between a slip ratio of a wheel and a normalized longitudinal force according to the present disclosure.

FIG. 4 shows a relationship 84 between (i) the slip ratio of one of the left and right rear wheels 30 and 32 and (ii) for the same wheel, the normalized longitudinal. The relationship 84 is plotted with respect to an x-axis 86 representing the slip ratio and a y-axis 88 representing the normalized longitudinal force. The relationship 84 is linear in a first region 90, the relationship 84 is both linear and nonlinear in a second region 92, and the relationship is nonlinear and a third region 94.

When the slip ratios of the left and right rear wheels 30 and 32 are both in a linear region (e.g., the first region 90), the tire longitudinal force module 58 selects relationship (9) to include in the second longitudinal force model. When one of the slip ratios of the left and right rear wheels 30 and 32 is in a linear region and the other one of the slip ratios is in a nonlinear region, the tire longitudinal force module 58 selects relationship (11) to include in the second longitudinal force model. When the slip ratios of the left and right rear wheels 30 and 32 are both in a nonlinear region (e.g., the third region 94), the tire longitudinal force module 58 selects relationship (10) to include in the second longitudinal force model.

Referring again to FIG. 3, at 76, the clutch torque module 56 estimates the actual amount of torque transferred by the clutch 34 of the eLSD 16 using the second clutch torque model. The second clutch torque model may be referred to as a locked eLSD model. In one example, the second clutch torque model is embodied by the following relationship:

$$T_{c\_act} = R_{eff,r}(F_{xrl} - F_{xrr}). \quad (12)$$

where $F_{xrl}$ and $F_{xrr}$ are the tire longitudinal forces at the left and right rear wheels 30 and 32 estimated using relationship (8) and one of relationships (9), (10), or (11). The method ends at 78.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    a clutch state module of a vehicle and configured to determine whether a clutch of an electronic limited slip differential is locked or unlocked, the electronic limited slip differential coupling an engine of a vehicle to left and right wheels of the vehicle; and
    a clutch torque module of the vehicle and configured to:
        estimate an actual torque transferred by the clutch using a first clutch torque model when the electronic limited slip differential is unlocked; and
        estimate the actual clutch torque using a second clutch torque model when the electronic limited slip differential is locked, wherein the second clutch torque model is different than the first clutch torque model.

2. The system of claim 1 wherein the first clutch torque model includes a hyperbolic tangent function.

3. The system of claim 2 wherein the hyperbolic tangent function is a function of a difference between speeds of the left and right wheels.

4. The system of claim 1 wherein:
    the first clutch torque model relates a requested clutch torque and a difference between speeds of the left and right wheels to the actual clutch torque; and
    the requested clutch torque is a requested amount of torque to be transferred by the clutch.

5. The system of claim 1 wherein the second clutch torque model relates a tire longitudinal force at the left wheel and a tire longitudinal force at the right wheel to the actual clutch torque.

6. The system of claim 5 further comprising a tire longitudinal force module configured to:
    estimate the tire longitudinal forces at the left and right wheels using a first longitudinal force model when the electronic limited slip differential is unlocked; and
    estimate the tire longitudinal forces at the left and right wheels using a second longitudinal force model when the electronic limited slip differential is locked, wherein the second longitudinal force model is different than the first longitudinal force model.

7. The system of claim 6 wherein:
    the first longitudinal force model relates the actual clutch torque and an axle input torque to the tire longitudinal forces at the left and right wheels; and
    the axle input torque is an amount of torque transferred from the engine to the electronic limited slip differential.

8. The system of claim 6 wherein:
    the second longitudinal force model includes:
        a first relationship between an axle input torque and the tire longitudinal forces at the left and right wheels; and
        a second relationship between tire vertical forces at the left and right wheels and the tire longitudinal forces at the left and right wheels; and
        the axle input torque is an amount of torque transferred from the engine to the electronic limited slip differential.

9. The system of claim 8 wherein, based on a slip ratio of the left and right wheels, the tire longitudinal force module selects the second relationship from a plurality of different relationships between the tire vertical forces at the left and right wheels and the tire longitudinal forces at the left and right wheels.

10. The system of claim 1 wherein the clutch state module configured to determine whether the clutch is locked or unlocked based on:
    a difference between speeds of the left and right wheels; and
    a torque capacity of the clutch.

11. A system comprising:
    a clutch state module of a vehicle and configured to determine whether a clutch of an electronic limited slip differential is locked or unlocked, the electronic limited slip differential coupling an engine of a vehicle to left and right wheels of the vehicle; and
    a tire longitudinal force module of the vehicle and configured to:
        estimate tire longitudinal forces at the left and right wheels using a first longitudinal force model when the electronic limited slip differential is unlocked; and
        estimate the tire longitudinal forces at the left and right wheels using a second longitudinal force model when the electronic limited slip differential is locked, wherein the second longitudinal force model is different than the first longitudinal force model.

12. The system of claim 11 wherein:
    the first longitudinal force model relates an actual clutch torque and an axle input torque to the tire longitudinal forces at the left and right wheels;
    the actual clutch torque is an actual torque transferred by the clutch; and
    the axle input torque is an amount of torque transferred from the engine to the electronic limited slip differential.

13. The system of claim 12 further comprising a clutch torque module configured to:
    estimate the actual clutch torque using a first clutch torque model when the electronic limited slip differential is unlocked; and
    estimate the actual clutch torque using a second clutch torque model when the electronic limited slip differential is locked, wherein the second clutch torque model is different than the first clutch torque model.

14. The system of claim 13 wherein:
    the first clutch torque model relates a requested clutch torque and a difference between the left and right wheel speeds to the actual clutch torque; and
    the requested clutch torque is a requested amount of torque to be transferred by the clutch.

15. The system of claim 13 wherein the second clutch torque model relates a tire longitudinal force at the left wheel and a tire longitudinal force at the right wheel to the actual clutch torque.

16. The system of claim 11 wherein the second longitudinal force model includes:
    a first relationship between an axle input torque and the tire longitudinal forces at the left and right wheels; and
    a second relationship between tire vertical forces at the left and right wheels and the tire longitudinal forces at the left and right wheels; and
    the axle input torque is an amount of torque transferred from the engine to the electronic limited slip differential.

17. The system of claim 16 wherein, based on a slip ratio of the left and right wheels, the tire longitudinal force module selects the second relationship from a plurality of different relationships between the tire vertical forces at the left and right wheels and the tire longitudinal forces at the left and right wheels.

18. A system comprising:
a clutch state module of a vehicle and configured to determine whether a clutch of an electronic limited slip differential is locked or unlocked, the electronic limited slip differential coupling an engine of a vehicle to left and right wheels of the vehicle;
a clutch torque module of the vehicle and configured to:
  estimate an actual torque transferred by the clutch using a first clutch torque model when the electronic limited slip differential is unlocked; and
  estimate the actual clutch torque using a second clutch torque model when the electronic limited slip differential is locked, wherein the second clutch torque model is different than the first clutch torque model; and
a tire longitudinal force module configured to:
  estimate tire longitudinal forces at the left and right wheels using a first longitudinal force model when the electronic limited slip differential is unlocked; and
  estimate the tire longitudinal forces at the left and right wheels using a second longitudinal force model when the electronic limited slip differential is locked, wherein the second longitudinal force model is different than the first clutch torque model.

19. The system of claim 18 wherein:
the first clutch torque model includes a first-order transfer function that relates a requested clutch torque and a hyperbolic tangent function of a difference between speeds of the left and right wheels to the actual clutch torque;
the requested clutch torque is a requested amount of torque while accounting for transient dynamics of the clutch to be transferred by the clutch;
the second clutch torque model relates a tire longitudinal force at the left wheel and a tire longitudinal force at the right wheel to the actual clutch torque;
the first longitudinal force model relates the actual clutch torque and an axle input torque to the tire longitudinal forces at the left and right wheels;
the axle input torque is an amount of torque transferred from the engine to the electronic limited slip differential; and
the second longitudinal force model includes:
  a first relationship between the axle input torque and the tire longitudinal forces at the left and right wheels; and
  a second relationship between tire vertical forces at the left and right wheels and the tire longitudinal forces at the left and right wheels.

20. The system of claim 19 wherein, based on a slip ratio of the left and right wheels, the tire longitudinal force module selects the second relationship from a plurality of different relationships between the tire vertical forces at the left and right wheels and the tire longitudinal forces at the left and right wheels.

* * * * *